United States Patent
Landis et al.

(10) Patent No.: US 9,109,338 B2
(45) Date of Patent: Aug. 18, 2015

(54) CONTROLLED DEWATERING OF CONFINED, SATURATED FORMATIONS IN EXCAVATION MINES

(71) Applicant: Halliburton Energy Services, Inc., Houston, TX (US)

(72) Inventors: Charles R. Landis, Houston, TX (US); Thomas S. Cortner, Houston, TX (US); Eric B. Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 80 days.

(21) Appl. No.: 13/873,527

(22) Filed: Apr. 30, 2013

(65) Prior Publication Data

US 2014/0321914 A1    Oct. 30, 2014

(51) Int. Cl.
| | | |
|---|---|---|
| *E02D 3/00* | (2006.01) | |
| *C09K 8/03* | (2006.01) | |
| *C09K 8/035* | (2006.01) | |
| *C09K 8/60* | (2006.01) | |
| *C09K 8/84* | (2006.01) | |
| *C09K 8/86* | (2006.01) | |
| *E21F 17/00* | (2006.01) | |

(52) U.S. Cl.
CPC . *E02D 3/00* (2013.01); *C09K 8/032* (2013.01); *C09K 8/035* (2013.01); *C09K 8/607* (2013.01); *C09K 8/845* (2013.01); *C09K 8/86* (2013.01); *E21F 17/00* (2013.01); *C09K 2208/12* (2013.01)

(58) Field of Classification Search
USPC .......................... 405/36, 258.1, 263, 264, 270
See application file for complete search history.

(56) References Cited

U.S. PATENT DOCUMENTS

| | | | |
|---|---|---|---|
| 4,153,549 A | 5/1979 | Wang et al. | |
| 4,349,228 A * | 9/1982 | Rohde | 299/10 |
| 4,986,696 A * | 1/1991 | Pera et al. | 405/36 |
| 5,405,554 A | 4/1995 | Neff et al. | |
| 6,497,283 B1 | 12/2002 | Eoff et al. | |
| 6,743,288 B2 | 6/2004 | Eoff et al. | |
| 6,822,061 B2 | 11/2004 | Eoff et al. | |
| 8,376,045 B2 | 2/2013 | Sarap et al. | |
| 2003/0040441 A1 | 2/2003 | Miller et al. | |
| 2008/0017416 A1* | 1/2008 | Watson et al. | 175/62 |
| 2008/0314124 A1 | 12/2008 | Sweeney et al. | |
| 2012/0205096 A1* | 8/2012 | Chhina et al. | 166/245 |
| 2012/0205127 A1* | 8/2012 | Gittins et al. | 166/401 |
| 2012/0288335 A1* | 11/2012 | Green | 405/264 |

FOREIGN PATENT DOCUMENTS

| | | | |
|---|---|---|---|
| WO | 0232965 | A1 | 4/2002 |
| WO | 2014179131 | A1 | 11/2014 |

OTHER PUBLICATIONS

Darley, et al., Composition and Properties of Drilling Fluids, 6th ed.; Gulf Professional Publishing, Houston, 1998.
Grim, R.E., "Clay Mineralogy," 2nd ed.; McGraw-Hill; New York, 1968, 185-233.
SPE 50712, "How do Anions in Water-Based Muds Affect Shale Stability?" Soc. of Petroleum Eng., 1999.
SPE 4232, "Stabilizing Sensitive Shales with Inhibited Potassium-Based Drilling Fluids," Journal of Petroleum Technology, pp. 1089-1100, 1973.
Product Data Sheet entitled Clay Grabber® Shale Stabilizer, 2010.
Halliburton Brochure entitled Stabilize Water-Sensitive Clays to Increase Sand Permeability for Improved Well Productivity, Cla-Web™ Clay Damage Control Additive, 2011.
Halliburton Brochure entitled Cla-Sta® XP Clay-Stabilizing Agent, 2008.
Halliburton brochure entitled Cla-Sta® FS Additive Mineral Fines and Clay-Stabilizing Additive, 2008.
Dalrymple et al., Relative Permeability Modifiers for Improved Oil Recovery: a Literature Review, 5th Intl. Conference on Reservoir Conformance Profile Control—Water and Gas Shutoff in Houston, Nov. 8-10, 1999.
Maegdefrau et al., "Die Kristallstruktur des Montmorillonits," Z. Krist, 98:299-323, 1937.
Marshall, C.E., "Layer Lattices and Base-Exchange Clays," Z. Krist, 91, 433-449, 1935.
Hendricks, S.B., "Lattice Structure of Clay Minerals and Some Properties of Clays," J. Geol., 50, 276-290, 1942.
O'Brien et al., "Stabilizing Sensitive Shales with Inhibited, Potassium-Based Drilling Fluids," J. Pet. Tech., v. 25(5), 1089-1100, 1973.
Hendricks et al., "Hydration Mechanism of the Clay Mineral Montmorillonite Saturated with Various Ions," J. Am. Chem. Soc., 62, 1457-1464, 1940.
Wear et al., "Potassium Fixation in Clay Minerals as Related to Crystal Structures," Soil Sci., 71, 1-14, 1951.
Page et al., "Ionic Size in Relation to Fixation of Cations by Colloidal Clay," Sol. Sci. Soc. Am. J, 4, 150-155, 1939.
International Search Report and Written Opinion for PCT/US2014/035150 dated Aug. 26, 2014.

* cited by examiner

*Primary Examiner* — Benjamin Fiorello
*Assistant Examiner* — Kyle Armstrong
(74) *Attorney, Agent, or Firm* — McDermott Will & Emery LLP; Holly Soehnge

(57) ABSTRACT

Methods to control dewatering of confined, saturated formations in excavation mines may include treating a portion of an untreated smectite shale barrier with a dewatering fluid thereby yielding a treated smectite shale barrier, wherein the untreated smectite shale barrier is associated with a confined, saturated formation that comprises water, and wherein the dewatering fluid comprises an aqueous base fluid and a dewatering additive; and draining at least a portion of the water from the confined, saturated formation through the treated smectite shale barrier. In some instances, the dewatering additive may include potassium citrate and potassium nitrate each independently in a concentration of about 0.5% to about 5% by weight of the aqueous base fluid.

9 Claims, No Drawings

CONTROLLED DEWATERING OF CONFINED, SATURATED FORMATIONS IN EXCAVATION MINES

BACKGROUND

The present invention relates to methods for controlled dewatering of confined, saturated formations in excavation mines.

In excavation mining, confined, saturated formations (e.g., sandstones and vugular formations) are lithologies saturated with water that are confined by a barrier lithology like smectite shale that is relatively water impermeable. The confined, saturated formations can hold significant volumes of water. Breach of the barrier of the confined, saturated formation, allow for the water of the confined, saturated formation to enter the mine and potentially flood the mine putting workers and equipment at risk. In some instances, when breached, the water within the confined, saturated formation can drain with significant force and quickly flood the mine, which is a significant risk to workers lives. Further, once a mine floods, pumping the water to the surface can take weeks, which is energy intensive and decreases mine productivity and profitability and makes difficult reaching workers that may be trapped in non-flooded areas.

To mitigate flooding, geologic data, like drilling and seismic data, may be used to provide general locations of the confined, saturated formation, which are then either avoided or underground rigs are used to drill through the barrier of the confined, saturated formation for draining. However, in some instances, draining via underground rigs cannot sufficiently keep up with the rate at which the water flows from the confined, saturated formation, which leads to flooding of the mine. Further, as the flooding is because of a high rate of water, the flooding is often fast and unexpected, which is a high risk to workers.

Therefore, a need exists for improved methods that can control the rate at which the water is released from the confined, saturated formations.

SUMMARY OF THE INVENTION

The present invention relates to methods for controlled dewatering of confined, saturated formations in excavation mines.

One embodiment of the present invention involves a method that includes treating a portion of an untreated smectite shale barrier with a dewatering fluid thereby yielding a treated smectite shale barrier, wherein the untreated smectite shale barrier is associated with a confined, saturated formation that comprises water, and wherein the dewatering fluid comprises an aqueous base fluid and a dewatering additive; and draining at least a portion of the water from the confined, saturated formation through the treated smectite shale barrier.

Another embodiment of the present invention involves a method that includes drilling a borehole into an untreated smectite shale barrier with a dewatering fluid without breaching the untreated smectite shale barrier into the saturated formation, thereby yielding a treated smectite shale barrier, wherein the untreated smectite shale barrier is associated with a confined, saturated formation that comprises water, and wherein the dewatering fluid comprises an aqueous base fluid and a dewatering additive; and draining at least a portion of the water from the confined, saturated formation through the treated smectite shale barrier.

Yet another embodiment of the present invention involves a method that includes treating a portion of an untreated smectite shale barrier with a dewatering fluid thereby yielding a treated smectite shale barrier, wherein the untreated smectite shale barrier is associated with a confined, saturated formation that comprises water; draining at least a portion of the water from the confined, saturated formation through the treated smectite shale barrier; and extending an excavation mine.

The features and advantages of the present invention will be readily apparent to those skilled in the art upon a reading of the description of the preferred embodiments that follows.

DETAILED DESCRIPTION

The present invention relates to methods for controlled dewatering of confined, saturated formations in excavation mines.

The present invention provides for, in some embodiments, methods that use a dewatering fluid to controllably create an enhanced-water-permeable portion of a smectite shale barrier from which water from a confined, saturated formation can be captured and directed out of an excavation mine. Such methods may advantageously mitigate mine flooding. Mitigation of mine flooding enhances worker safety and decreases costs associated with equipment damage. Further, mitigating mine flooding mitigates the disruption to the mining process, which enhances mine productivity and profitability.

Smectite shale is a family of clays that consist of clay platelets having an alumina sheet disposed between two silica sheets, commonly referred to as a 2:1 configuration. Without being limited by theory, it is believed that the permeability and strength of the smectite shale is dependent on the cations associated with the clay platelets. Therefore, a dewatering fluid comprising a cation that has a lower hydration and associates strongly with the clay platelets may be capable of replacing existing cations and their hydration, thereby providing space for water to flow more readily therethrough and strengthening the smectite shale. It should be noted that, as used herein, the term "dewater" does not indicate or imply a 100% reduction in water within a clay structure.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Some embodiments may involve treating a portion of an untreated smectite shale barrier with a dewatering fluid thereby yielding a treated smectite shale barrier, wherein the untreated smectite shale barrier is associated with a confined, saturated formation that comprises water; and draining at least a portion of the water from the confined, saturated formation through the treated smectite shale barrier. Some embodiments may further involve extending an excavation mine. Extension of the mine may, in some embodiments, be through at least a portion of the confined, saturated formation, through a portion of rock proximal to the confined, saturated formation, or a combination thereof. It should be noted that as used herein, the term "untreated smectite shale barrier" is used for clarity in referring to the treatment being outlined in the method/step and does not imply that the smectite shale barrier has never treated.

Without being limited by theory, it is believed that dewatering fluids described herein increase the permeability and strength of smectite shale. This then allows for the water in the confined, saturated formation to flow through the path of least resistance (i.e., the portion of the smectite shale barrier treated with the dewatering fluid), thereby allowing for controlled dewatering of the confined, saturated formation. Further, it is believed that the treated smectite shale barrier will allow water to flow therethrough at a controlled rate, which is less than that of free flowing water from the confined, saturated formation. As such, the risk of the underground rig failing due to high flow rates or high pressures may be mitigated, which, in turn, mitigates the risk to workers.

Treating the smectite shale barrier may be achieved via several methods. For example, some embodiments may involve drilling a borehole into an untreated smectite shale barrier with a dewatering fluid described herein. Without being limited by theory, it is believed that drilling a borehole with a dewatering fluid described herein may sufficiently treat the portion of the smectite shale barrier proximal to the wellbore, thereby allowing water to flow therethrough. Such boreholes may be vertical, horizontal, or any angle therebetween.

Dewatering fluids described herein may, in some embodiments, comprise an aqueous base fluid and a dewatering additive. In some embodiments, dewatering additives may comprise at least one of cationic oligomers, cationic polymers, nonionic N-containing oligomers, nonionic N-containing polymers, potassium salts, ammonium salts, iron salts, aluminum salts, phosphonium salts, acids, and any combination thereof.

Aqueous base fluids suitable for use in the dewatering fluids described herein may comprise fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the dewatering additive described herein.

Examples of cationic oligomers (e.g., compounds with less than about 5 monomeric units) and cationic polymers may include, but are not limited to, those with at least one monomeric unit of alkylene imine, ethylene imine, propylene imine, amine, ethylene amine, an organo-amine, quaternized amine, acrylamides, methacrylamide, putresine, cadaverine, spermidine, spermine, diethylenetriamine, tetramethylenediamine, triethylenetetramine, tetraethylenepentamine, diallyldimethylammonium chloride (DADMAC), (2-methacryloyloxyethyl) trimethyl ammonium chloride (DMC), and the like, any derivative thereof, any salt thereof, and any combination thereof. In some embodiments, a cationic polymer may be a copolymer including at least one of the foregoing monomeric units. As used herein, the term "copolymer" encompasses block copolymers, random copolymers, comb copolymers, blend polymers, graft copolymers, star or dendritic polymers, terpolymers, and the like.

Examples of nonionic N-containing oligomers and nonionic N-containing polymers may include, but are not limited to, those with at least one monomeric unit of vinylpyrrolidone, acrylamide, methacrylamide, amine, imine, and the like, any derivative thereof, and any combination thereof. In some embodiments, a nonionic N-containing polymer may be a copolymer including at least one of the foregoing monomeric units.

Examples of salts (e.g., potassium salts, ammonium salts, iron salts, aluminum salts, and phosphonium salts) may, in some embodiments, be salts that include a counterion like fluoride, chloride, chlorate, bromide, iodide, iodate, acetate, citrate, oxalate, formate, nitrate, phosphate dibasic, phosphate monobasic, sulfate, bisulfite, carbonate, dichromate, ferrate, and the like, and any combination thereof.

Examples of acids suitable for use in conjunction with dewatering additives may include, but are not limited to, hyperchlorous acid, hydrochloric acid, hydrofluoric acid, nitric acid, phosphoric acid, sulfuric acid, acetic acid, formic acid, lactic acid, citric acid, and the like, any derivative thereof, and any combination thereof.

In some embodiments, a dewatering additive may be present in a dewatering fluid in an amount ranging from a lower limit of about 0.01%, 0.1%, 1%, or 2% by weight of the aqueous base fluid to an upper limit of about 10%, 7%, 5%, or 2% by weight of the aqueous base fluid, wherein the amount of dewatering additive may range from any lower limit to any upper limit and encompasses any subset therebetween. For example, the dewatering additive may comprise potassium citrate and potassium nitrate each independently at a concentration of about 0.5% to about 5% by weight of the aqueous base fluid.

Embodiments disclosed herein include:

A: a method that includes treating a portion of an untreated smectite shale barrier with a dewatering fluid thereby yielding a treated smectite shale barrier, wherein the untreated smectite shale barrier is associated with a confined, saturated formation that comprises water, and wherein the dewatering fluid comprises an aqueous base fluid and a dewatering additive; and draining at least a portion of the water from the confined, saturated formation through the treated smectite shale barrier;

B: a method that includes drilling a borehole into an untreated smectite shale barrier with a dewatering fluid thereby yielding a treated smectite shale barrier, wherein the untreated smectite shale barrier is associated with a confined, saturated formation that comprises water, and wherein the dewatering fluid comprises an aqueous base fluid and a dewatering additive; and draining at least a portion of the water from the confined, saturated formation through the treated smectite shale barrier; and C: a method that includes treating a portion of an untreated smectite shale barrier with a dewatering fluid thereby yielding a treated smectite shale barrier, wherein the untreated smectite shale barrier is associated with a confined, saturated formation that comprises water; draining at least a portion of the water from the confined, saturated formation through the treated smectite shale barrier; and extending an excavation mine.

Each of embodiments A, B, and C may have one or more of the following additional elements in any combination: Element 1: the dewatering additive including at least one selected from the group consisting of a cationic oligomer, a potassium salt, an ammonium salt, an iron salt, an aluminum salt, a phosphonium salt, an acid, and any combination thereof; Element 2: the dewatering additive including a cationic oligomer having at least one monomer selected from the group consisting of alkylene imine, ethylene imine, propylene imine, amine, ethylene amine, an organo-amine, quaternized amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, any derivative thereof, any salt thereof, and any combination thereof; Element 3: the dewatering additive including a cationic oligomer having at least one monomer selected from the group consisting of vinylpyrrolidone, acrylamide, methacrylamide, amine, imine, any derivative thereof, and any combination thereof; Element 4: the dewatering additive including a potassium salt having at least one selected from the group consisting of potassium fluoride, potassium chloride, potassium chlorate, potassium bromide, potassium iodide, potassium iodate, potassium acetate, potassium citrate, potassium formate, potassium nitrate, potassium phosphate dibasic, potassium phosphate monobasic, potassium sulfate, potassium bisulfate, potassium carbonate, potassium dichromate, potassium ferrate, and any combination thereof; Element 5: the dewatering additive including an acid that includes at least one selected from the group consisting of hyperchlorous acid, hydrochloric acid, hydrofluoric acid, nitric acid, phosphoric acid, sulfuric acid, acetic acid, formic acid, lactic acid, citric acid, any derivative thereof, and any combination thereof; Element 6: the dewatering additive being present in a concentration of about 0.01% to about 10% by weight of the aqueous base fluid; and Element 7: the dewatering additive including potassium citrate and potassium nitrate each independently in a concentration of about 0.5% to about 5% by weight of the aqueous base fluid.

By way of non-limiting example, exemplary combinations applicable to A, B, C include: at least two of Elements 2-5; Element 6 in combination with at least one of Elements 1-5; and the like.

The exemplary dewatering fluids disclosed herein may directly or indirectly affect one or more components or pieces of equipment associated with the preparation, delivery, recapture, recycling, reuse, and/or disposal of the disclosed dewatering fluids. For example, the disclosed dewatering fluids may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary dewatering fluids. The disclosed dewatering fluids may also directly or indirectly affect any transport or delivery equipment used to convey the dewatering fluids to a well site or downhole such as, for example, any transport vessels, conduits, pipelines, trucks, tubulars, and/or pipes used to fluidically move the dewatering fluids from one location to another, any pumps, compressors, or motors (e.g., topside or downhole) used to drive the dewatering fluids into motion, any valves or related joints used to regulate the pressure or flow rate of the dewatering fluids, and any sensors (i.e., pressure and temperature), gauges, and/or combinations thereof, and the like. The disclosed dewatering fluids may also directly or indirectly affect the various downhole equipment and tools that may come into contact with the dewatering fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

To facilitate a better understanding of the present invention, the following examples of preferred or representative embodiments are given. In no way should the following examples be read to limit, or to define, the scope of the invention.

EXAMPLES

Example 1

A dewatering fluid was prepared with 2 wt % potassium nitrate and 2 wt % potassium citrate. A series of shale samples were placed in a cell and saturated with the dewatering fluid at 65 psi for 3 days. Then the shale samples were flushed with the dewatering fluid at 65 psi for 6 days. The resultant dewatered shale samples were allowed to dry at room temperature until reaching a steady state moisture content of 18%. The samples were then tested along with a control of untreated shale according to the ASTM Standard Test Method for Direct Shear Test of Soils Under Consolidated Drained Conditions.

Under an effective normal pressure of 4.17 ksf (kilopounds per square foot), the dewatered shale failed at a higher shear stress (4.73 ksf) than the control sample (2.74 ksf). That is, the treated sample showed a nearly two-fold higher resistance to failure by shearing forces than the untreated sample at the same normal stress. Such strengthening indicates the cation exchange described herein, which allow provides for higher water permeability.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing an untreated smectite shale barrier confining a saturated formation that comprises water;
accessing the untreated smectite shale barrier adjacent to an excavation mine;
drilling a borehole into the untreated smectite shale barrier from the excavation mine with a dewatering fluid without breaching the untreated smectite shale barrier into the saturated formation, wherein a portion of the untreated smectite shale barrier contacted by the dewatering fluid becomes a treated smectite shale barrier that has a greater water permeability than the untreated smectite shale barrier, wherein the dewatering fluid comprises an aqueous base fluid and a dewatering additive; and draining at least a portion of the water from the confined, saturated formation through the treated smectite shale barrier.

2. The method of claim 1, wherein the dewatering additive comprises at least one selected from the group consisting of a cationic oligomer, a nonionic N-containing oligomer, a nonionic N-containing polymer, a potassium salt, an ammonium salt, an iron salt, an aluminum salt, a phosphonium salt, an acid, and any combination thereof.

3. The method of claim 2, wherein the cationic oligomer comprises at least one monomer selected from the group consisting of alkylene imine, ethylene imine, propylene imine, amine, ethylene amine, an organo-amine, quaternized amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, any derivative thereof, any salt thereof, and any combination thereof.

4. The method of claim 2, wherein the nonionic N-containing oligomer or the nonionic N-containing polymer comprises at least one monomer selected from the group consisting of vinylpyrrolidone, acrylamide, methacrylamide, amine, imine, any derivative thereof, and any combination thereof.

5. The method of claim 2, wherein the potassium salt comprises at least one selected from the group consisting of potassium fluoride, potassium chloride, potassium chlorate, potassium bromide, potassium iodide, potassium iodate, potassium acetate, potassium citrate, potassium formate, potassium nitrate, potassium phosphate dibasic, potassium phosphate monobasic, potassium sulfate, potassium bisulfate, potassium carbonate, potassium dichromate, potassium ferrate, and any combination thereof.

6. The method of claim 2, wherein the acid comprises at least one selected from the group consisting of hyperchlorous acid, hydrochloric acid, hydrofluoric acid, nitric acid, phosphoric acid, sulfuric acid, acetic acid, formic acid, lactic acid, citric acid, any derivative thereof, and any combination thereof.

7. The method of claim 1, wherein dewatering additive is present in a concentration of about 0.01% to about 10% by weight of the aqueous base fluid.

8. The method of claim 1, wherein the dewatering additive comprises potassium citrate and potassium nitrate each independently in a concentration of about 0.5% to about 5% by weight of the aqueous base fluid.

9. The method of claim 1 further comprising:
extending the excavation mine through a portion of the confined, saturated formation having been at least partially drained.

* * * * *